US012135626B2

(12) United States Patent
Vijayvargiya et al.

(10) Patent No.: US 12,135,626 B2
(45) Date of Patent: Nov. 5, 2024

(54) CONTAINER-LEVEL MONITORING

(71) Applicant: VMware LLC, Palo Alto, CA (US)

(72) Inventors: Shirish Vijayvargiya, Pune (IN); Alok Nemchand Kataria, Pune (IN); Rayanagouda Bheemanagouda Patil, Pune (IN)

(73) Assignee: VMware LLC, Palo Alto, CA (US)

(\*) Notice: Subject to any disclaimer, the term of this patent is extended or adjusted under 35 U.S.C. 154(b) by 139 days.

(21) Appl. No.: 16/535,109

(22) Filed: Aug. 8, 2019

(65) Prior Publication Data

US 2020/0401492 A1    Dec. 24, 2020

(30) Foreign Application Priority Data

Jun. 19, 2019   (IN) .............................. 201941024348

(51) Int. Cl.
*G06F 11/30*     (2006.01)
*G06F 9/455*     (2018.01)
*G06F 16/188*    (2019.01)
*H04L 9/40*      (2022.01)

(52) U.S. Cl.
CPC ........ *G06F 11/301* (2013.01); *G06F 9/45558* (2013.01); *G06F 16/188* (2019.01); *H04L 63/0227* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 10,762,049 B1* | 9/2020 | Liang | G06F 11/323 |
| 10,824,726 B1* | 11/2020 | Herman Saffar | G06F 21/566 |
| 2018/0210801 A1* | 7/2018 | Wu | H04L 43/08 |
| 2018/0260574 A1* | 9/2018 | Morello | G06F 21/566 |
| 2019/0273744 A1* | 9/2019 | Goel | H04L 63/101 |
| 2019/0310935 A1* | 10/2019 | Shuster | G06N 5/003 |
| 2020/0026545 A1* | 1/2020 | Wang | H04L 69/04 |
| 2020/0193016 A1* | 6/2020 | Zeng | G06F 11/0712 |
| 2020/0372153 A1* | 11/2020 | Thakkar | G06F 21/562 |
| 2021/0209222 A1* | 7/2021 | Jeong | G06F 21/60 |

\* cited by examiner

*Primary Examiner* — Wynuel S Aquino
(74) *Attorney, Agent, or Firm* — King Intellectual Asset Management

(57) ABSTRACT

Embodiments of the present disclosure relate to container-level monitoring. Embodiments include detecting, by an agent of a virtual machine, an event. Embodiments include determining, by the agent of the virtual machine, an address related to the event. Embodiments include accessing, by the agent of the virtual machine, container mapping information. Embodiments include locating, by the agent of the virtual machine, the address in the container mapping information. Embodiments include determining, by the agent of the virtual machine, based on the locating, that the event is associated with a container. Embodiments include determining, by the agent of the virtual machine, one or more attributes of the container. Embodiments include determining, by the agent of the virtual machine, based on information related to the event and the one or more attributes of the container, whether to block or allow an action related to the event.

21 Claims, 5 Drawing Sheets

CONTAINER-LEVEL MONITORING

RELATED APPLICATIONS

Benefit is claimed under 35 U.S.C. 119(a)-(d) to Foreign Application Serial No. 201941024348 filed in India entitled "CONTAINER-LEVEL MONITORING", on Jun. 19, 2019, by VMWARE, Inc., which is herein incorporated in its entirety by reference for all purposes.

BACKGROUND

A data center, in some cases, comprises a plurality of hosts in communication over a physical network infrastructure, each host having one or more virtual computing instances (VCIs) such as virtual machines (VMs) and/or containers that are connected to logical overlay networks that may span multiple hosts and are decoupled from the underlying physical network infrastructure. Applications running on VMs are susceptible to malicious attacks. Though certain embodiments are described herein with respect to VMs, it should be noted that the teachings herein may also apply to other types of VCIs.

A malicious attack (e.g., such as performed by malware) on a VM often attacks the application level (e.g., by spreading through the operating environment of the VM, introducing new processes, manipulating processes to communicate with new insecure devices, etc.). A security manager (e.g., AppDefense™ from VMware, Inc. in Palo Alto, CA.) aims to protect against malicious attacks on VMs. The security manager is a data center endpoint security system that protects applications running on VMs in logical networks. The security manager verifies behaviors of a VM, such as actions of a process, including one or more known processes, unwanted processes, changed processes, and/or changed network connections communication ports, etc. For example, the security manager monitors such behaviors and compares them against a data set generated from one or more past approved behaviors of the VM (e.g., a behavior history or an intended state), which may include behaviors of one or more applications executed by the VM. Based on the comparison, the security manager may allow or disallow the behavior, generate a warning or notification regarding the behavior, or perform some other action.

SUMMARY

Herein described are one or more embodiments of a method. The method generally includes: detecting, by an agent of a virtual machine, an event; determining, by the agent of the virtual machine, an address related to the event; accessing, by the agent of the virtual machine, container mapping information; locating, by the agent of the virtual machine, the address in the container mapping information; determining, by the agent of the virtual machine, based on the locating, that the event is associated with a container; determining, by the agent of the virtual machine, one or more attributes of the container; and determining, by the agent of the virtual machine, based on information related to the event and the one or more attributes of the container, whether to block or allow an action related to the event.

Also described herein are embodiments of a computer system, wherein software for the computer system is programmed to execute the method described above.

Also described herein are embodiments of a non-transitory computer readable medium comprising instructions to be executed in a computer system, wherein the instructions when executed in the computer system perform the method described above.

DETAILED DESCRIPTION

Figure 1:
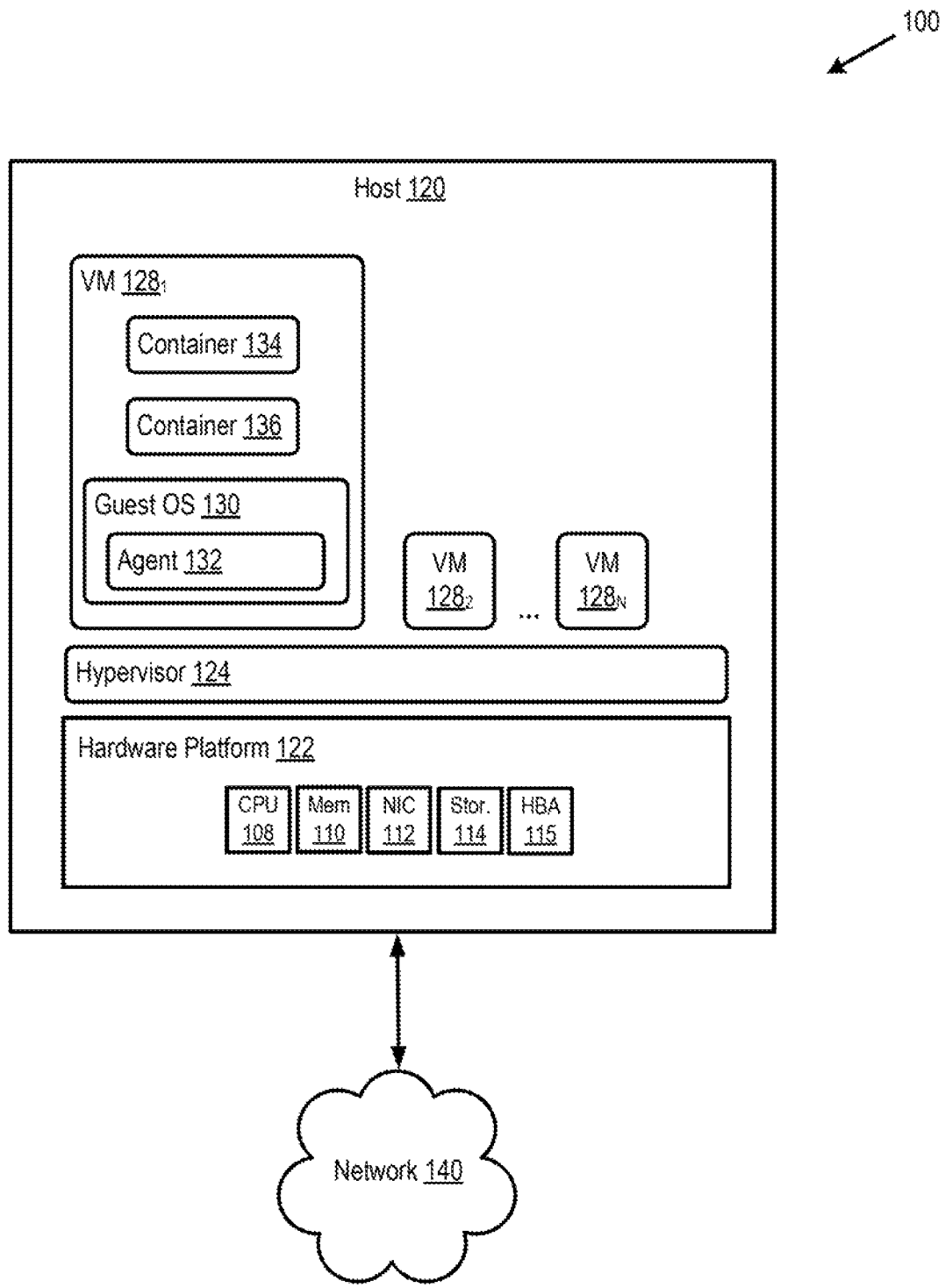
FIG. 1 illustrates components of an example computing environment in which embodiments may be implemented.

Embodiments presented herein relate to techniques for container-level monitoring. Techniques described herein allow an agent component of a virtual machine (VM) to monitor connections and processes that are initiated within a container running on the VM without adding any additional components within the container. Accordingly, embodiments presented herein provide "container aware" monitoring, and not just VM level monitoring, that can recognize when a process or connection is initiated within a particular container running on a VM.

For example, certain firewalls may determine whether to allow or deny a network connection to or from an endpoint based on context information related to the network connection, such as user identity of a user initiating the network connection, application specific attributes of an endpoint initiating the connection, such as a binary file hash, publisher information, licensing, certificates, and process information. An endpoint can be, for instance, a VM or a container within a VM. In another example, an agent of a VM may monitor processes initiated within the VM in order to determine whether to allow or block the processes based on context information associated with the processes, such as process names, process paths, users associated with the processes, MD5 checksums, and package information. However, when a connection or process is initiated from within a container running on a VM, it is difficult to determine the context of the connection or process from outside of the container. This is because containers are designed to provide isolated space and separate runtime environments, and there is limited or no visibility into connections or processes initiated within the container from outside the container. Furthermore, due to container isolation and the lack of visibility into a container from outside, certain systems may not provide the ability to control or block actions inside the container, such as initiating processes or connections, from outside the container.

Embodiments of the present disclosure address the challenge of identifying context information of a container without installing any additional component, such as an agent, inside the container, such as in order to provide context-based firewall and connection monitoring capability that is container-aware. In certain embodiments, an agent running within the guest operating system (OS) of a VM is used to monitor connections and processes initiated from within containers running on the VM.

In an embodiment, the agent registers with a process connector service of the guest OS in order to receive notifications of events, such as when a container is initiated on the VM. As such, when a container is launched, the agent receives an event notification that includes information about the container, such as a process identifier of the container. In some embodiments, the agent then accesses a process file system of the guest OS to retrieve additional container information based on the process identifier of the container, such as a container identifier, a container name, an identifier of a user associated with the container, an internet protocol (IP) address of the container. The agent then stores the process identifier of the container along with the container information in container mapping information. In some examples, the container mapping information contains hashed data that maps process identifiers to container information of containers associated with the process identifiers. The agent then uses the container mapping information as part of a technique for monitoring connections and processes initiated from within containers.

In a first embodiment, the agent registers with a network filter queue service of the guest OS, and the network filter queue service holds each connection initiated from within a container until receiving a decision regarding whether to allow or block the connection. In an example, the filter queue provides information about a connection, such as a source IP address, source port, destination IP address, and destination port of the connection, to the agent. The agent then accesses the container mapping information to determine whether the connection came from within a container based on the information about the connection received from the filter queue. For example, the agent may determine whether an entry in the container mapping information contains the source IP address of the connection, which would indicate that the source IP address belonged to a container. In an example, the agent retrieves container information of a container corresponding the connection information from the container mapping information. The agent then builds context information for the connection by supplementing the connection information received from the filter queue with the container information retrieved from the container mapping information, and sends the context information along with the connection information to a firewall component. In one example, the firewall component is an identity-based firewall, and determines whether to allow or block the connection based on a user associated with the container from which the connection was initiated. In some embodiments, the firewall component sends a block or allow decision back to the agent, which then passes the block or allow decision back to the filter queue. The filter queue then blocks or allows the connection according to the decision.

In a second embodiment, the agent registers with a file notification service of the guest OS. The file notification service provides the agent with a notification every time a file is accessed within a container and holds the file access until receiving a decision about whether to allow or block the file access. In an example, the file notification service provides information about a file accessed, such as a path and filename of the file. The agent then accesses the container mapping information to determine whether the file is within a container based on the file information received from the file notification service. For example, the agent may determine whether an entry in the container mapping information contains at least one component of the path of the file (e.g., which may correspond to the container name of the container), which would indicate that the file is within the container. If the file corresponds to a container, in some embodiments, the agent then uses a file checker service of the guest OS to determine whether the file is a process (e.g., an executable file). If the file is not a process, then the agent may take no further action. In some examples, if the file is a process, the agent then determines whether the process is present in a "white list" that identifies approved processes, and then issues a block or allow decision to the file notification service based on whether the process is on the white list. The white list may be generated by an administrator or automatically by one or more components within the VM. The file notification service then blocks or allows the file access according to the decision.

FIG. 1 illustrates components of a computing environment 100 in which embodiments of the present disclosure may be implemented. As shown, computing environment 100 includes a host 120 connected to a network 140. Network 140 may, for example, be a local area network (LAN), wide area network (WAN), cellular data network, the Internet, or any connection over which data may be transmitted.

Host 120 is configured with a virtualization layer, referred to herein as hypervisor 124, that abstracts processor, memory, storage, and networking resources of hardware platform 122 into multiple virtual machines $128_1$ to $128_N$ (collectively referred to as VMs 128 and individually referred to as VM 128). VMs on the same host 120 may use any suitable overlaying guest operating system(s), such as guest OS 130, and run concurrently with the other VMs.

Hypervisor 124 architecture may vary. In some aspects, hypervisor 124 can be installed as system level software directly on the hosts 120 (often referred to as a "bare metal" installation) and be conceptually interposed between the physical hardware and the guest operating systems executing in the VMs. Alternatively, hypervisor 124 may conceptually run "on top of" a conventional host operating system in the server. In some implementations, hypervisor 124 may comprise system level software as well as a privileged VM machine (not shown) that has access to the physical hardware resources of the host 120. In such implementations, a virtual switch, virtual tunnel endpoint (VTEP), etc., along with hardware drivers, may reside in the privileged VM.

Hardware platform 122 of host 120 includes components of a computing device such as one or more processors (CPUs) 108, a system memory 110, a network interface 112, a storage system 114, a host bus adapter (HBA) 115, and other I/O devices such as, for example, a USB interface (not shown). CPU 108 is configured to execute instructions such as executable instructions that perform one or more operations described herein. The executable instructions may be stored in memory 110 and in storage 114. Network interface 112 enables host 120 to communicate with other devices via a communication medium, such as network 140. Network interface 112 may include one or more network adapters or ports, also referred to as Network Interface Cards (NICs), for connecting to one or more physical networks.

VM $128_1$ comprises containers 134 and 136 and a guest OS 130. Each of containers 134 and 136 generally represents a nested virtualized computing instance within VM $128_1$. Implementing containers on virtual machines allows for response time to be improved as booting a container is generally faster than booting a VM. All containers in a VM run on a common OS kernel, thereby fully utilizing and sharing CPU, memory, I/O controller, and network bandwidth of the host VM. Containers also have smaller footprints than VMs, thus improving density. Storage space can also be saved, as the container uses a mounted shared file system on the host kernel, and does not create duplicate system files from the parent OS.

VM $128_1$ further comprises a guest OS 130 (e.g., Microsoft Windows®, Linux™ or another commodity operating system) and an agent 132 running on top of guest OS 130. Agent 132 generally represents a security component for VM $128_1$ that monitors connections and processes within VM $128_1$ to identify and prevent malicious attacks. In certain embodiments of the present disclosure, agent 132 is made container-aware through the use of one or more services of guest OS 130 in order to monitor and control connections and processes that are initiated within container 134, as described in more detail below with respect to FIGS. 2-5.

Figure 2:
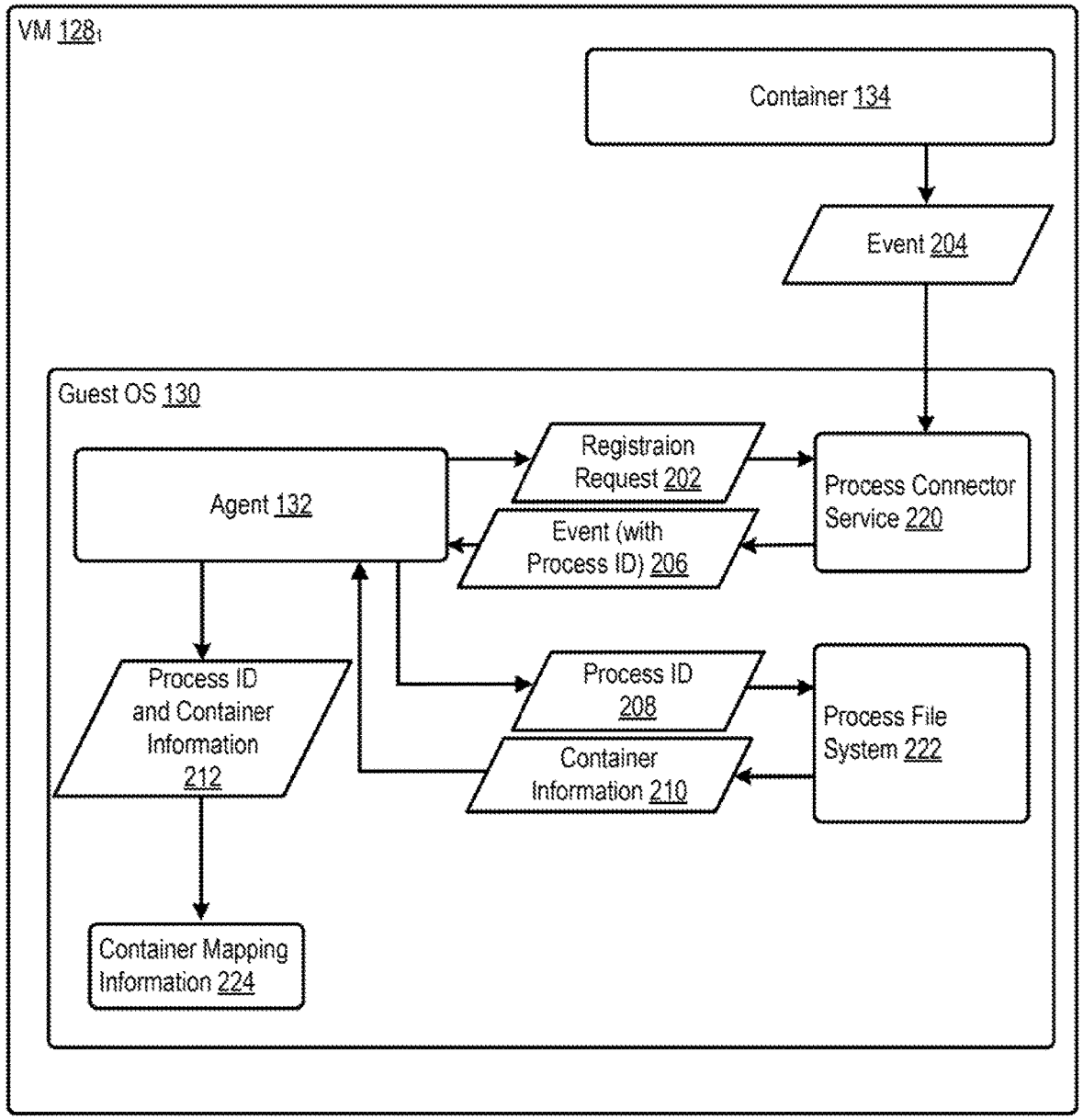
FIG. 2 illustrates an exchange of data between components of a computing environment in which embodiments of the present disclosure may be implemented.

FIG. 2 illustrates an exchange of data between components of a computing environment in which embodiments of the present disclosure may be implemented. FIG. 2 includes VM $128_1$, container 134, guest OS 130, and agent 132 of FIG. 1. The exchange of messages depicted in FIG. 2 generally represents a technique for building container mapping information 224, which is used in monitoring and controlling connections and processes within container 134.

At 202, agent 132 sends a registration request to process connector service 220. Process connector service 220 generally represents a service of guest OS 130 that provides event notifications to registered components whenever processes are initiated or terminated within VM $128_1$. In one example, process connector service 220 is the process connector interface provided by the Linux™ kernel.

At 204, process connector service 220 receives an event from container 134, such as when container 134 is initialized. Because agent 132 registered with process connector service 220 at 202, process connector service 220 provides an event notification at 206 to agent 132 including a process identifier of the process represented by the event at 204. In one example, the process identifier is a process identifier of container 134.

At 208, agent 132 accesses process file system 222 to look for container information corresponding to the process identifier. In one example, process file system 222 represents a directory within a file system of guest OS 130 that includes container information for all containers running on VM $128_1$. In certain embodiments, process file system 222 contains folders named for the process identifiers of each given process running on guest OS 130, each folder containing information corresponding to the given process. In one embodiment, agent 132 checks the directory (e.g., "/proc/<host_process_id>/cgroup") of process file system 222 to determine whether container information corresponding to the process identifier is present in the directory. If container information is present, this indicates that the process is a container, as "cgroup" files in process file system 222 only include container information for process identifiers of containers. As such, at 210, agent 132 retrieves container information corresponding to the process identifier from process file system 222. The container information can include, for example, a container identifier, a container name, an identifier of a user associated with the container, an IP address of the container, a port of the container, and/or the like.

At 212, agent 132 stores the process identifier in association with the container information in container mapping information 224. In certain embodiments, agent 132 stores container mapping information 224 in process file system 222. In some embodiments, container mapping information 224 stores container information corresponding to a given process identifier in various directories corresponding to the given process identifier, such as the directories "/proc/<pid_in_hash_map>/cwd/proc/net/tcp" and "/proc/<pid_in_hash_map>/cwd/proc/net/tcp6".

Container mapping information 224 generally represents information that associates process identifiers of containers to container information of the containers, such as by storing the container information in directories associated with the process identifiers. In some embodiments, container mapping information 224 comprises a hash of each respective process identifier mapped to a hash of each respective set of container information. Agent 132 may define a hash key that it uses to store and retrieve data from container mapping information 224. Agent 132 uses container mapping information 224 in monitoring and controlling connections and processes in container 134, as described in more detail below with respect to FIGS. 3-5.

Figure 3:
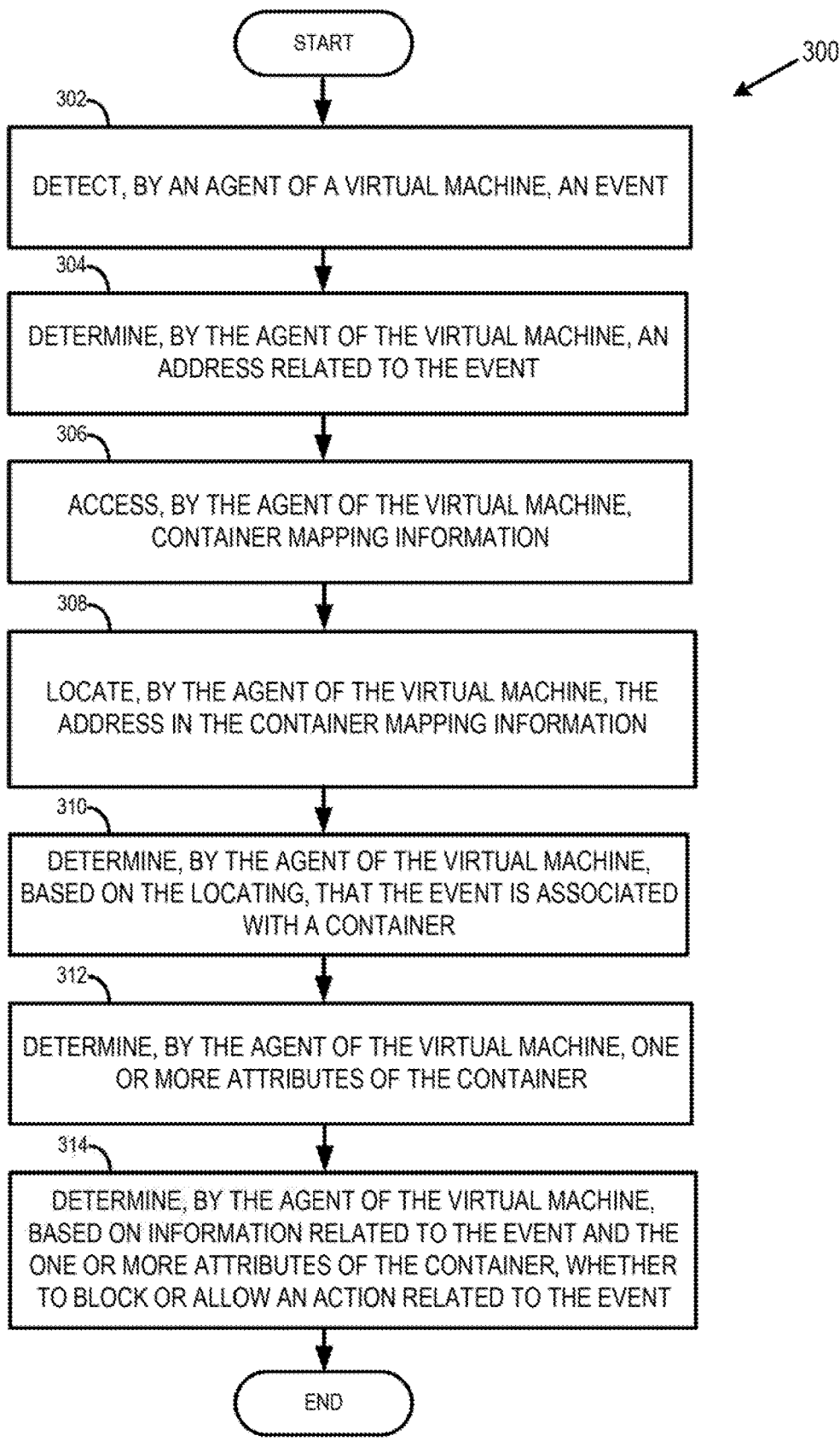
FIG. 3 illustrates example operations related to container-level monitoring, according to embodiments of the present disclosure.

FIG. 3 illustrates example operations 300 related to container-level monitoring, according to embodiments of the present disclosure. In one example, operations 300 are performed by agent 132 of FIG. 1.

At step 302, an agent of a virtual machine detects an event. In an example, agent 132 of FIG. 1 determines that an event has taken place within container 134 of FIG. 1. In some embodiments, the event is a connection request, as described in more detail below with respect to FIG. 4. In other embodiments, the event is a file access request, as described in more detail below with respect to FIG. 5. In certain examples, agent 132 of FIG. 1 registers with a service provided by guest OS 130 of FIG. 1 that detects an initiation of a connection or process within container 134 of FIG. 1, sends information related to the connection or process to agent 132 of FIG. 1, and places a hold on the connection or process until receiving a decision from agent 132 of FIG. 1 as to whether to block or allow the connection or process.

At step 304, the agent of the virtual machine determines an address related to the event. In some embodiments, the address is an IP address associated with a connection event, as described in more detail below with respect to FIG. 4. In other embodiments, the address is a file path associated with a file access event, as described in more detail below with respect to FIG. 6. In certain examples, agent 132 of FIG. 1 determines the address based on information received from the service of the OS with which agent 132 of FIG. 1 has registered.

At step 306, the agent of the virtual machine accesses container mapping information. In an example, the container mapping information was generated as described above with respect to container mapping information 224 of FIG. 2, and is accessed by agent 132 of FIG. 1.

At step 308, the agent of the virtual machine locates the address in the container mapping information. In an example, agent 132 of FIG. 1 determines that an entry in container mapping information 224 of FIG. 2 includes the address determined at step 304.

At step 310, the agent of the virtual machine determines, based on the locating, that the event is associated with a container. In an example, if agent 132 of FIG. 1 locates the address in container mapping information 224 of FIG. 2, then it determines that the event is associated with the container, as the address would not be present in container mapping information 224 if it did not correspond to a container.

At step 312, the agent of the virtual machine determines one or more attributes of the container. In an example, agent 132 of FIG. 1 retrieves container information from container mapping information 224 of FIG. 2 that is associated with the address, the container information including the one or more attributes of the container.

At step 314, the agent of the virtual machine determines, based on information related to the event and the one or more attributes of the container, whether to block or allow an action related to the event. In some embodiments, agent 132 of FIG. 1 sends connection information related to a connection event along with context information including the one or more attributes of the container to a firewall component that determines whether to block or allow the connection event, as described in more detail below with respect to FIG. 4. In other embodiments, agent 132 of FIG. 1 determines whether a file access event involves an executable file and then determines whether to block or allow the file access event by determining whether the executable file is present in a process white list, as described in more detail below with respect to FIG. 5. In certain embodiments, agent 132 of FIG. 1 responds to the service of guest OS 130 of FIG. 1 with a decision of whether to block or allow the connection or file access, and the service of guest OS 130 of FIG. 1 blocks or allows the connection or file access accordingly.

Figure 4:
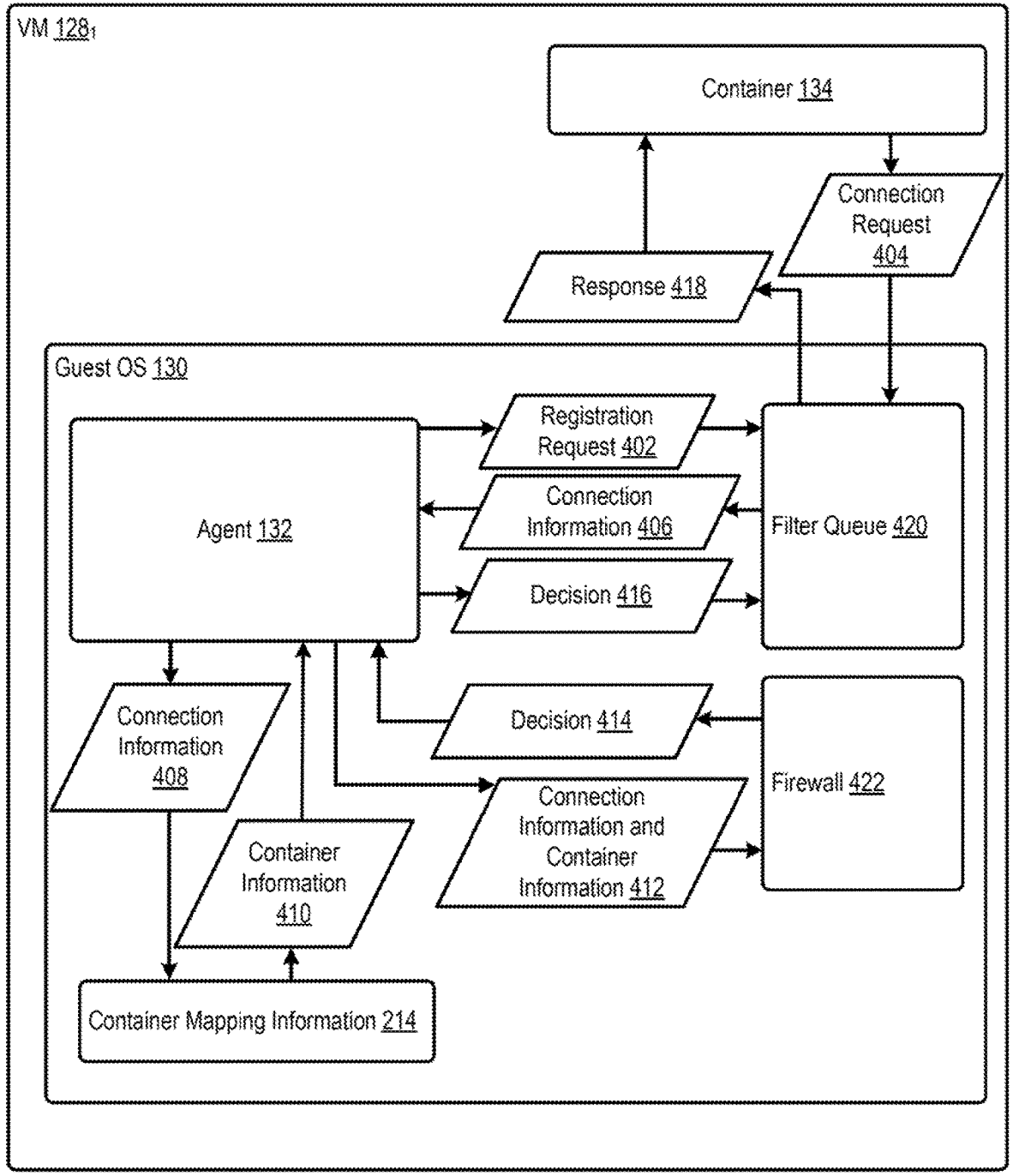
FIG. 4 illustrates an example of container-level connection monitoring.

FIG. 4 illustrates an example of container-level connection monitoring. FIG. 4 includes VM $128_1$, guest OS 130, agent 132, and container 134 of FIG. 1 and container mapping information 214 of FIG. 2.

Agent 132 sends a registration request 402 to filter queue 420. Filter queue 420 generally represents a service provided by guest OS 130 that detects connection requests from within container 134, notifies registered components of information related to the connection requests, and places a hold on the connection requests until receiving decisions as to whether to block or allow the connection requests. As such, when filter queue 420 detects connection request 404 from container 134, filter queue 420 sends connection information 406 relating to connection request 404 to agent 132, which is registered with filter queue 420. Connection information 406 generally includes, for example, a source IP address, source port, destination IP address, and/or destination port of the connection requested by connection request 404.

Agent 132 uses connection information 408, which is at least a subset of connection information 406, to retrieve container information 410 from container mapping information 214. In an example, agent 132 accesses container mapping information 214 and determines whether a source IP address of connection information 406 is present in container mapping information 214, which would indicate that the source IP address corresponds to a container. In an example, directories for each process identifier within container mapping information 214 are scanned to check for a source IP address, source port, destination IP address, and/or destination port from connection information 406. Upon identifying an entry within container mapping information 214 that includes the source IP address, source port, destination IP address, and/or destination port from connection information 406, agent 132 retrieves container information 410 from the entry.

Agent 132 provides connection information and container information 412 (retrieved at 406 and 410) to firewall 422. Firewall 422 generally represents a firewall component that applies firewall rules in order to determine whether to block or allow connections. In an example, firewall 422 is an identity-based firewall that determines whether to block or allow a connection based on a user identifier associated with the connection. As such, in certain embodiments, firewall 422 uses a user identifier included in connection information and container information 412 (e.g., retrieved from container mapping information 214) to apply identity-based firewall rules. Firewall 422 then returns a decision 414 to agent 132 indicating whether the connection is blocked or allowed. Although firewall 422 is illustrated within the guest OS 130, in many implementations, the firewall 422 will reside outside the context of VM $128_1$, such as within hypervisor 124 of FIG. 1. Communication between a hypervisor-based firewall (not shown) and agent 132 may be by way of a hypercall or other communication mechanism. The firewall itself may be in communication over network 140 of FIG. 1 or a separate management network (not shown) with a policy server, controller cluster, or other system (not shown) that communicates firewall rules and/or policies to hypervisor 124 of FIG. 1 for enforcement thereon.

Agent 132 returns decision 416, based on decision 414, to filter queue 420, indicating whether the connection should be blocked or allowed. Filter queue 420, which has held the connection requested in connection request 404 until receiving a decision, blocks or allows the connection based on decision 416. Filter queue 420 sends a response 418 to container 134 indicating whether the connection was blocked or allowed.

Figure 5:
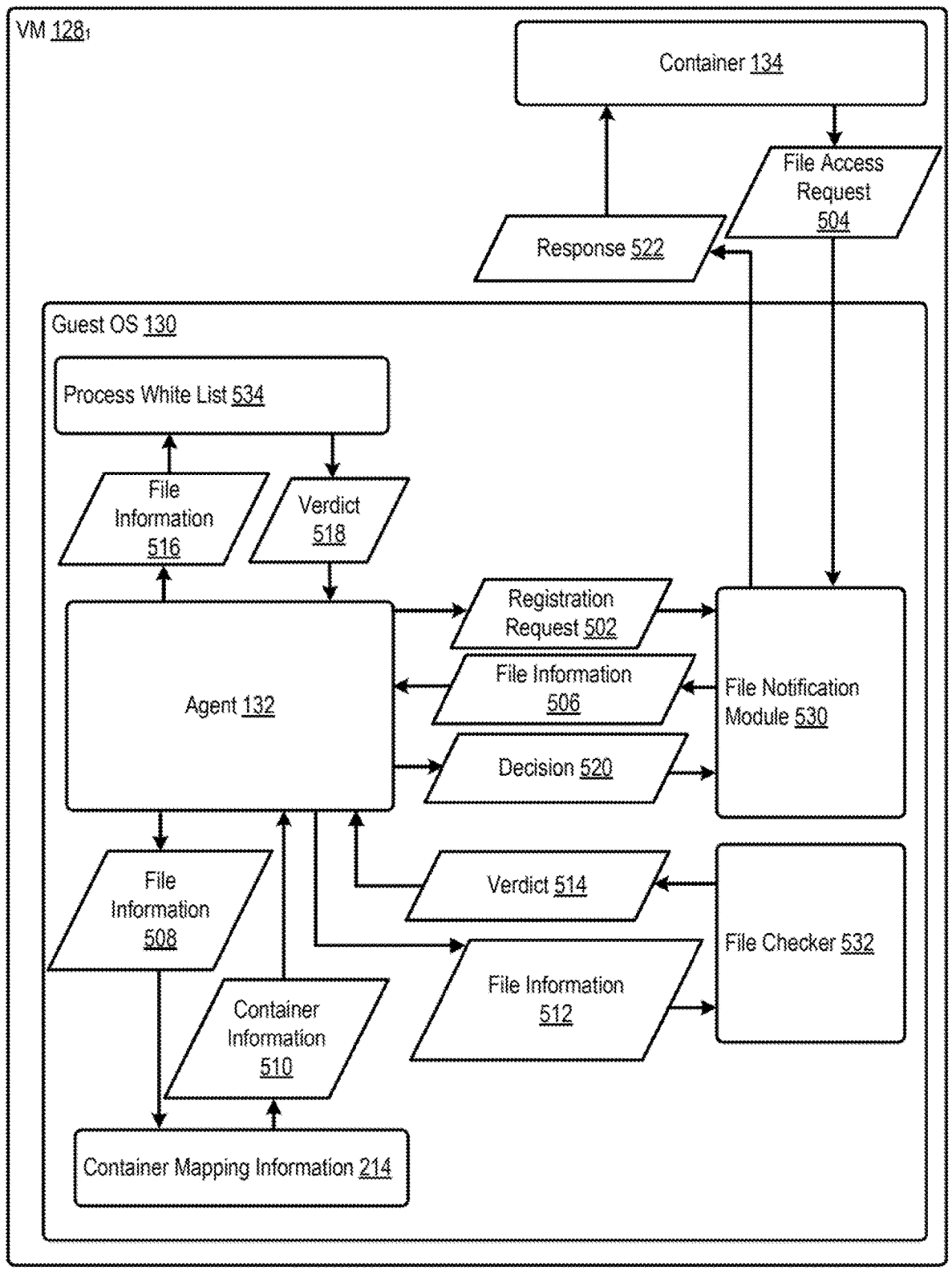
FIG. 5 illustrates an example of container-level process monitoring.

FIG. 5 illustrates an example an example of container-level process monitoring. FIG. 5 includes VM $128_1$, guest OS 130, agent 132, and container 134 of FIG. 1 and container mapping information 214 of FIG. 2.

Agent 132 sends a registration request 502 to file notification module 530. File notification module 530 generally represents a service provided by guest OS 130 that detects file access requests from within container 134, notifies registered components of information related to the file access requests, and places a hold on the file access requests until receiving decisions as to whether to block or allow the file access requests. As such, when file notification module 530 detects file access request 504 from container 134, file notification module 530 sends file information 506 relating to file access request 504 to agent 132, which is registered with file notification module 530. File information 506 generally includes, for example, a file name, file path, associated user, MD5 checksum, and/or package information of the file associated with file access request 504.

Agent 132 uses file information 508, which is at least a subset of file information 506, to retrieve container information 510 from container mapping information 214. In an example, agent 132 accesses container mapping information 214 and determines whether a file path of file information 506 is present in container mapping information 214, which would indicate that the file path corresponds to a container. Upon identifying an entry within container mapping information 214 that includes the file path, agent 132 retrieves container information 510 from the entry.

Agent 132 provides file information 512 (retrieved at 510) to file checker 532. File checker 532 generally represents a service of guest OS 130 that determines whether a given file is an executable file, such as based on metadata associated with the file. File checker 532 returns a verdict 514 to agent 132 indicating whether the file is an executable file. If the file is not an executable file, then agent 132 takes no further action with respect to the file, as the file is not a process. If the file is an executable file, then agent 132 proceeds with checking process white list 534 in order to determine whether to block or allow the file access event. Process white list 534 is a list of processes that are known to be safe, and are permitted to execute within VM $128_1$. In some embodiments, process white list 534 has been defined in advance, such as by an administrator. In other embodiments, process white list 534 is generated through an automated process in which a learning mode is used. In certain embodiments, the learning mode involves providing processes along with context information, such as container information, to a separate context engine that determines whether certain processes are permitted, such as via a rule enforcer agent, and stores process information and related context information of permitted processes in process white list 534. It is noted that white list 534 is only included as one example, and that other techniques such as black lists may alternatively be employed. A black list generally refers to a list of processes that are known to be malicious or are otherwise not permitted to run.

While process white list 534 is shown residing within guest OS 130, in other implementations, process white list 534 may reside outside the context of VM $128_1$. For example, process white list 534 may be maintained by a component of hypervisor 124 of FIG. 1. In such cases communication between agent 132 and white list 534 may be by way of a hypercall or other communication mechanism between the guest OS and hypervisor. Whitelist 534, moreover, may be at least a subset of a global whitelist maintained by central manager, controller cluster, security server, or other centralized or distributed database (not shown). A local control plane agent (not shown) residing at hypervisor 124 of FIG. 1 may be responsible for maintaining and updating white list 534 by communicating over network 140 of FIG. 1 or separate management network (not shown) with the centralized or distributed database or management, control, or security server(s).

Agent 132 determines a verdict 518 regarding whether the file information 516 is present in process white list 534. Agent 132 then returns decision 520, based on verdict 518, to file notification module 530, indicating whether the file access should be blocked or allowed. File notification module 530, which has held the file access requested in file access request 504 until receiving a decision, blocks or allows the file access based on decision 520. File notification module 530 sends a response 522 to container 134 indicating whether the file access was blocked or allowed.

Embodiments described herein allow agent 132 to become aware of and control connections and processes initiated within containers without requiring additional components to be added to the containers. As such, particular firewall and white list techniques described herein are only included as examples, and other techniques may also be used to determine whether to block or allow connections or processes.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in a non-transitory computer-readable medium of the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The computer readable media may be non-transitory. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method, comprising:
registering, by an agent running in a virtual machine, with a process connector service of a guest operating system (OS) of the virtual machine in order to receive event notifications;
receiving, by the agent, based on the registering and from the process connector service, a first notification of a first event indicating launch of a process initiating a first container, the notification comprising a process identifier of the process initiating the first container; and
generating, by the agent and based on the notification, container mapping information for the first container, the container mapping information comprising one or more mappings of the process identifier of the process initiating the first container to one or more of:
a container name of the first container;
a container identifier of the first container;
a network address of the first container; or
a user identifier related to the first container;
receiving, by the agent and from a service of the guest OS, information about a second event, the second event being associated with the first container and comprising a connection request or a file access request, the second notification comprising one or more of:
the container name of the first container; or
the network address of the first container;
in response to receiving the information about the second event:
accessing the container mapping information for the first container; and
based at least in part on the container mapping information for the first container, determining one or more event-related identifiers associated with the first container;
determining, by the agent, based at least in part one or more event-related identifiers, whether to block or allow an action related to the second event; and
causing the action to be blocked in response to determining that the action should be blocked or causing the action to be allowed in response to determining that the action should be allowed.

2. The method of claim 1, wherein the second event comprises the connection request, and the connection request comprises the network address of the container as a source or destination internet protocol (IP) address.

3. The method of claim 1, wherein the one or more event-related identifiers comprises the process identifier of the process initiating the first container.

4. The method of claim 1, wherein:
the second event comprises the file access request;
the information about the second event comprises a file path comprising the name of the first container; and
the method further comprises:
determining, by the agent, whether a file associated with the second event is an executable file based on information obtained from the guest OS; and
determining, by the agent, whether to check a white list for the file based on whether the file is an executable file.

5. The method of claim 1, wherein the one or more event-related identifiers comprises the user identifier related to the container.

6. The method of claim 1, wherein determining whether to block or allow the action related to the second event comprises:

providing, by the agent, at least one of the one or more event-related identifiers to a firewall component; and
receiving a block or allow decision from the firewall component.

7. The method of claim 1, wherein determining whether to block or allow the action related to the second event comprises:
determining, by the agent, whether a process related to the second event is present in a white list;
if the process is present in the white list, determining to allow the action; and
if the process is not present in the white list, determining to block the action.

8. A non-transitory computer readable medium comprising instructions to be executed in a computer system, wherein the instructions when executed in the computer system perform a method, the method comprising:
registering, by an agent running in a virtual machine, with a process connector service of a guest operating system (OS) of the virtual machine in order to receive event notifications;
receiving, by the agent, based on the registering and from the process connector service, a first notification of a first event indicating launch of a process initiating a first container, the notification comprising a process identifier of the process initiating the first container; and
generating, by the agent and based on the notification, container mapping information for the first container, the container mapping information comprising one or more mappings of the process identifier of the process initiating the first container to one or more of:
a container name of the first container;
a container identifier of the first container;
a network address of the first container; or
a user identifier related to the first container;
receiving, by the agent and from a service of the guest OS, information about a second event, the second event being associated with the first container and comprising a connection request or a file access request, the second notification comprising one or more of:
the container name of the first container; or
the network address of the first container;
in response to receiving the information about the second event:
accessing the container mapping information for the first container; and
based at least in part on the container mapping information for the first container, determining one or more event-related identifiers associated with the first container;
determining, by the agent, based at least in part one or more event-related identifiers, whether to block or allow an action related to the second event; and
causing the action to be blocked in response to determining that the action should be blocked or causing the action to be allowed in response to determining that the action should be allowed.

9. The non-transitory computer readable medium of claim 8, wherein the second event comprises the connection request, and the connection request comprises the network address of the container as a source or destination internet protocol (IP) address.

10. The non-transitory computer readable medium of claim 8, wherein the one or more event-related identifiers comprises the process identifier of the process initiating the first container.

11. The non-transitory computer readable medium of claim 8, wherein:
the second event comprises the file access request;
the information about the second event comprises a file path comprising the name of the first container; and
the method further comprises:
determining, by the agent, whether a file associated with the second event is an executable file based on information obtained from the guest OS; and
determining, by the agent, whether to check a white list for the file based on whether the file is an executable file.

12. The non-transitory computer readable medium of claim 8, wherein the one or more event-related identifiers comprises the user identifier related to the container.

13. The non-transitory computer readable medium of claim 8, wherein determining whether to block or allow the action related to the second event comprises:
providing, by the agent, at least one of the one or more event-related identifiers to a firewall component; and
receiving a block or allow decision from the firewall component.

14. The non-transitory computer readable medium of claim 8, wherein determining whether to block or allow the action related to the second event comprises:
determining, by the agent, whether a process related to the second event is present in a white list;
if the process is present in the white list, determining to allow the action; and
if the process is not present in the white list, determining to block the action.

15. A system comprising one or more processors and a non-transitory computer readable medium comprising instructions that, when executed by the one or more processors, cause the one or more processors to perform a method, the method comprising:
registering, by an agent running in a virtual machine, with a process connector service of a guest operating system (OS) of the virtual machine in order to receive event notifications;
receiving, by the agent, based on the registering and from the process connector service, a first notification of a first event indicating launch of a process initiating a first container, the notification comprising a process identifier of the process initiating the first container; and
generating, by the agent and based on the notification, container mapping information for the first container, the container mapping information comprising one or more mappings of the process identifier of the process initiating the first container to one or more of:
a container name of the first container;
a container identifier of the first container;
a network address of the first container; or
a user identifier related to the first container;
receiving, by the agent and from a service of the guest OS, information about a second event, the second event being associated with the first container and comprising a connection request or a file access request, the second notification comprising one or more of:
the container name of the first container; or
the network address of the first container;
in response to receiving the information about the second event:
accessing the container mapping information for the first container; and
based at least in part on the container mapping information for the first container, determining one or more event-related identifiers associated with the first container;
determining, by the agent, based at least in part one or more event-related identifiers, whether to block or allow an action related to the second event; and
causing the action to be blocked in response to determining that the action should be blocked or causing the action to be allowed in response to determining that the action should be allowed.

16. The system of claim 15, wherein the second event comprises the connection request, and the connection request comprises the network address of the container as a source or destination internet protocol (IP) address.

17. The system of claim 15, wherein the one or more event-related identifiers comprises the process identifier of the process initiating the first container.

18. The system of claim 15, wherein:
the second event comprises the file access request;
the information about the second event comprises a file path comprising the name of the first container; and
the method further comprises:
determining, by the agent, whether a file associated with the second event is an executable file based on information obtained from the guest OS; and
determining, by the agent, whether to check a white list for the file based on whether the file is an executable file.

19. The system of claim 15, wherein the one or more event-related identifiers comprises the user identifier related to the container.

20. The system of claim 15, wherein determining whether to block or allow the action related to the second event comprises:
providing, by the agent, at least one of the one or more event-related identifiers to a firewall component; and
receiving a block or allow decision from the firewall component.

21. The system of claim 15, wherein determining whether to block or allow the action related to the second event comprises:
determining, by the agent, whether a process related to the second event is present in a white list;
if the process is present in the white list, determining to allow the action; and
if the process is not present in the white list, determining to block the action.

\* \* \* \* \*